United States Patent
Briliauskas et al.

(10) Patent No.: US 12,483,531 B2
(45) Date of Patent: *Nov. 25, 2025

(54) SYSTEM AND METHOD FOR MULTI-LAYERED RULE LEARNING IN URL FILTERING

(71) Applicant: UAB 360 IT, Vilnius (LT)

(72) Inventors: Mantas Briliauskas, Vilnius (LT); Vykintas Maknickas, Vilnius (LT); Jonas Palacionis, Vilnius (LT)

(73) Assignee: UAB 360 IT, Vilnius (LT)

( * ) Notice: Subject to any disclaimer, the term of this patent is extended or adjusted under 35 U.S.C. 154(b) by 139 days.

This patent is subject to a terminal disclaimer.

(21) Appl. No.: 18/417,367

(22) Filed: Jan. 19, 2024

(65) Prior Publication Data

US 2024/0414125 A1 Dec. 12, 2024

Related U.S. Application Data

(63) Continuation-in-part of application No. 17/948,857, filed on Sep. 20, 2022, now Pat. No. 11,916,875, which is a continuation of application No. 17/545,479, filed on Dec. 8, 2021, now Pat. No. 11,470,044.

(51) Int. Cl.
 *H04L 9/40* (2022.01)
 *G06N 20/00* (2019.01)

(52) U.S. Cl.
 CPC ......... *H04L 63/0236* (2013.01); *G06N 20/00* (2019.01); *H04L 63/0263* (2013.01); *H04L 63/1416* (2013.01)

(58) Field of Classification Search
 CPC ............. H04L 63/0236; H04L 63/0263; H04L 63/1416; G06N 20/00
 USPC .......................................................... 726/1
 See application file for complete search history.

(56) References Cited

U.S. PATENT DOCUMENTS

| | | | |
|---|---|---|---|
| 8,499,283 B2 * | 7/2013 | Mony | G06F 9/45512 717/124 |
| 9,690,933 B1 * | 6/2017 | Singh | G06N 5/025 |
| 10,902,117 B1 * | 1/2021 | Singh | G06N 5/025 |
| 2009/0210419 A1 * | 8/2009 | Chitnis | G06F 16/951 |

(Continued)

FOREIGN PATENT DOCUMENTS

CN 110784462 A * 2/2020 ......... H04L 63/1483

*Primary Examiner* — Badri Narayanan Champakesan
*Assistant Examiner* — Badri Champakesan
(74) *Attorney, Agent, or Firm* — Moser Taboada

(57) ABSTRACT

A system for URL filtering includes a processor and a memory having stored therein at least programs or instructions executable by the processor to cause the system to filter a received URL by comparing the URL to a blocklist to predict if a resource associated with the URL is malicious, if the URL does not match a URL on the blocklist, filter the URL by applying an ML algorithm to predict whether a resource associated with the URL is malicious, if the resource is not malicious, filter the URL by comparing a visual feature of a resource with a respective visual feature of known non-malicious webpages to identify similarities and/or differences to determine if a resource is malicious, and if the resource is malicious, generate and transmit a URL filter determination that the resource associated with the URL is malicious and update the blocklist to include the URL.

15 Claims, 6 Drawing Sheets

(56) References Cited

U.S. PATENT DOCUMENTS

| | | | |
|---|---|---|---|
| 2012/0158626 A1* | 6/2012 | Zhu | G06F 21/56 726/22 |
| 2014/0298460 A1* | 10/2014 | Xue | H04L 63/1425 726/23 |
| 2015/0007312 A1* | 1/2015 | Pidathala | H04L 63/1433 726/22 |
| 2017/0091270 A1* | 3/2017 | Guo | G06F 16/5854 |
| 2019/0104154 A1* | 4/2019 | Kumar | G06N 20/00 |
| 2020/0195688 A1* | 6/2020 | Prakash | G06F 21/44 |
| 2020/0358819 A1* | 11/2020 | Bowditch | G06F 17/18 |
| 2021/0027306 A1* | 1/2021 | Somaraju | G06Q 50/01 |
| 2021/0097168 A1* | 4/2021 | Patel | G06F 21/554 |
| 2021/0377301 A1* | 12/2021 | Desai | G06F 21/577 |
| 2022/0030029 A1* | 1/2022 | Kagan | G06F 21/44 |

\* cited by examiner

SYSTEM AND METHOD FOR MULTI-LAYERED RULE LEARNING IN URL FILTERING

CROSS-REFERENCE TO RELATED APPLICATIONS

This application is a Continuation-in-Part of and claims benefit of and priority to U.S. patent application Ser. No. 17/948,857, filed Sep. 20, 2022, which is a Continuation of and claims benefit of and priority to U.S. patent application Ser. No. 17/545,479 filed Dec. 8, 2021, now U.S. Pat. No. 11,470,044 issued on Oct. 11, 2022, which are all herein incorporated by reference in their entireties.

FIELD

This disclosure relates generally to computer security, and more particularly to identifying security issues in uniform resource locators (URLs).

BACKGROUND

Today, computers face ever-growing threats to security and privacy on the Internet. Malicious Uniform Resource Locators (URLs) are URLs associated with malicious content. Malicious URLs are widely used in the computing industry to perform cyber attacks on web users and their computing systems. Malicious URLs include phishing URLs, spamming URLs and malware URLs.

The traditional line of defense against accessing malicious URLs is to compare a URL requested by a user device against a blocklist (also referred to as a blacklist) of malicious URLs stored remotely from the user device. If the requested URL matches a URL on the blocklist, the user device is notified that the requested URL may be malicious and limits access to the URL. Otherwise, if the requested URL does not match a URL on the blocklist, the user device is permitted to access the URL.

Although blocklists are an effective means for identifying a known malicious URL, blocklists cannot detect unknown malicious URLs. Therefore, it is easy for cyber attackers to evade conventional blocklist systems by continuously modifying the manner in which malicious URLs are configured, thereby finding new approaches to attack web users, web browsers, search engines and the like.

SUMMARY

Systems and methods for URL filtering are provided herein. In some embodiments, a system includes a hardware processor; and a memory accessible by the processor, the memory having stored therein at least one of programs or instructions executable by the at least one processor to cause the filtering system to perform operations including receiving a URL request to access a resource associated with the URL, filtering the URL by comparing the URL to a blocklist of URLs having respective malicious resources associated to predict if a resource associated with the URL is malicious, if it is determined that the URL does not match a URL on the blocklist and that, as such, a resource associated with the URL is not malicious, filtering the URL by applying a machine learning algorithm trained to analyze the URL using block list rules to predict whether a resource associated with the URL is malicious, if it is determined, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious, and if it is determined that a resource associated with the URL is malicious, generating and transmitting a URL filter determination that the resource associated with the URL is malicious and updating the blocklist to include the URL.

In some embodiments, a method for URL filtering includes receiving a URL request to access a resource associated with the URL, filtering the URL by comparing the URL to a blocklist of URLs having respective malicious resources associated to predict if a resource associated with the URL is malicious, if it is determined that the URL does not match a URL on the blocklist and that, as such, a resource associated with the URL is not malicious, filtering the URL by applying a machine learning algorithm trained to analyze the URL using block list rules to predict whether a resource associated with the URL is malicious, if it is determined, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious, and if it is determined that a resource associated with the URL is malicious, generating and transmitting a URL filter determination that the resource associated with the URL is malicious and updating the blocklist to include the URL.

In some embodiments, a non-transitory computer readable medium, which when executed by a processor and a memory, performs a URL filtering method that includes receiving a URL request to access a resource associated with the URL, filtering the URL by comparing the URL to a blocklist of URLs having respective malicious resources associated to predict if a resource associated with the URL is malicious, if it is determined that the URL does not match a URL on the blocklist and that, as such, a resource associated with the URL is not malicious, filtering the URL by applying a machine learning algorithm trained to analyze the URL using block list rules to predict whether a resource associated with the URL is malicious, if it is determined, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious, and if it is determined that a resource associated with the URL is malicious, generating and transmitting a URL filter determination that the resource associated with the URL is malicious and updating the blocklist to include the URL.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
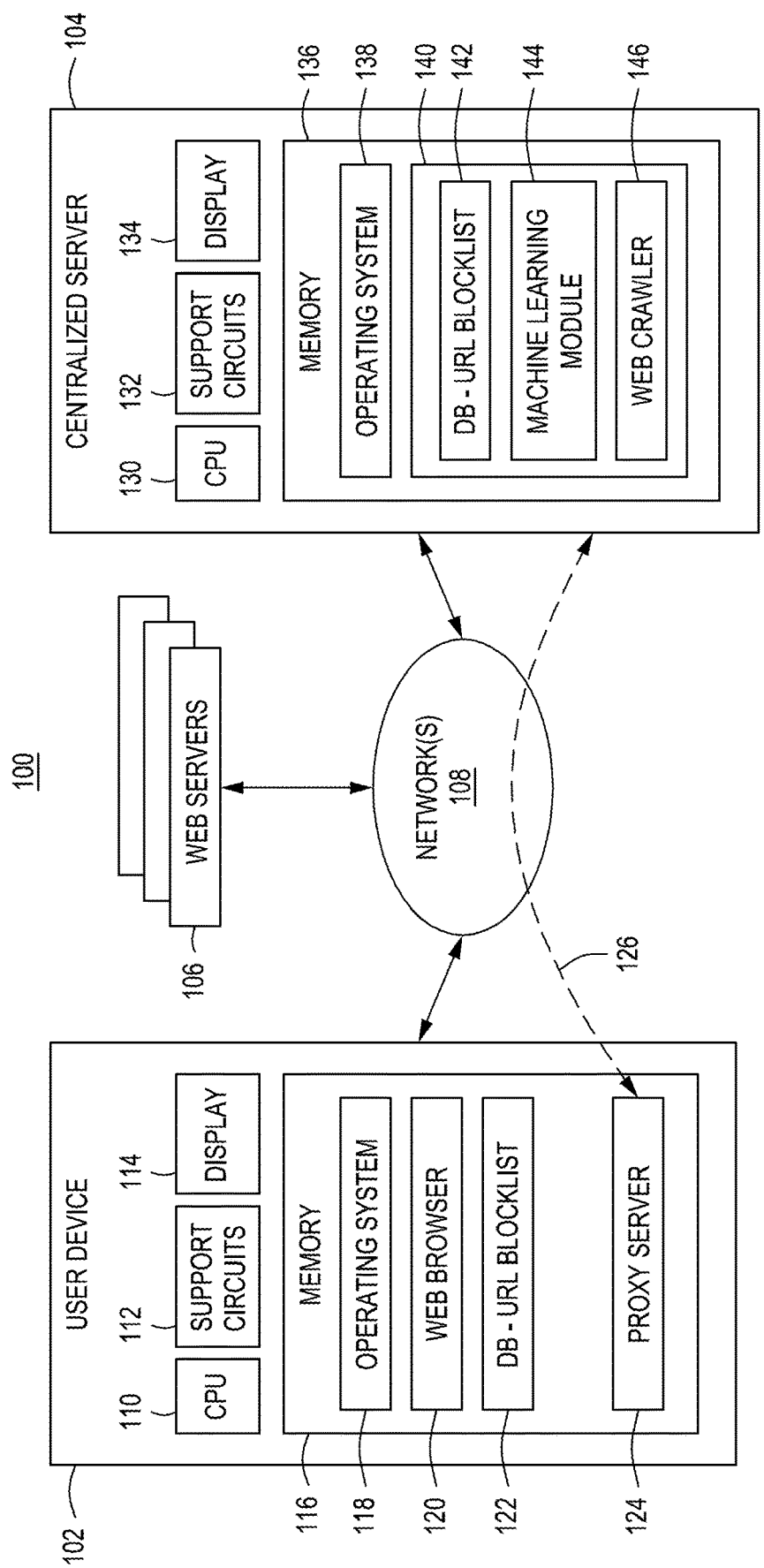
FIG. 1 depicts a high-level block diagram of a network architecture of a system for URL filtering in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for URL filtering. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with URL requests from user devices since some URLs can be malicious. In some embodiments, the URLs are identified through access and rendering of web page URLs using a web crawler. Web crawlers are internet bots that systematically browse the internet and are typically operated by search engines to index the internet. The use of web crawlers is well known for internet indexing, i.e., identifying new URLs, updated content at URLs, unused URLs, and the like. To identify URLs, some embodiments of the disclosure use a web crawler to systematically browse the internet. A server application operates the web crawler to render the content at each accessed URL. For each obtained URL, a machine learning algorithm analyzes the URL to derive blocklist rules for unseen URLs based on seen URLs. Malicious URLs are often generated in predictable patterns that can be identified through machine learning models to detect specific undesirable attributes of the content that indicate undesirable content. Malicious URLs are URLs that may include content that a user would deem unimportant and/or would cause harm to the user device (e.g., malware, viruses, etc.). The identified URLs may then be added to a global block list on the server and then sent to a blocklist on one or more user devices.

In embodiments where a web crawler is not used, an application on a user device may visit a web location via a URL and use a machine learning algorithm on the text that comprises the URL to identify whether the resource associated with the URL is malicious or not. URLs identified as malicious may be sent to a centralized server for dissemination to other user devices for use in their block lists or the user device may disseminate the URLs directly to other user devices. In this manner, the search and identification of undesirable URLs is distributed and democratized across a user base.

Thus, systems, apparatuses, and methods consistent with embodiments of this present disclosure detect malicious URLs using URL machine learning. Such detected URLs may be handled according to various rules, e.g., allowing access to the resource requested with the URL, blocking access to the resource requested with the URL, reporting the resource associated with the URL, allowing access to the resource requested with the URL only upon user authorization, etc., Details of such systems, apparatuses and methods are described in detail below with respect to the figures.

FIG. 1 depicts a block diagram of a Multi-Layered Rule Learning and URL Filtering system 100 in accordance with at least one embodiment of the disclosure. The system 100 includes one or more user devices 102, a centralized server 102, and web servers 106 communicatively coupled via one or more networks 108.

The networks 106 comprise one or more communication systems that connect computers by wire, cable, fiber optic and/or wireless link facilitated by various types of well-known network elements, such as hubs, switches, routers, and the like. The networks 106 may include an Internet Protocol (IP) network, a public switched telephone network (PSTN), or other mobile communication networks, and may employ various well-known protocols to communicate information amongst the network resources.

The end-user device 102 comprises a Central Processing Unit (CPU) 110, support circuits 112, display device 114, and memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, web browser 120, a URL blocklist 122 in the form of a database, file or other storage structure, and a transparent proxy server 124.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well known application for accessing and displaying web page content. Such browsers include, but are not limited to, Safari®, Chrome®, Explorer®, Firefox®, etc., The URL blocklist 122 is a list of URLs that is stored in the form of a database, file or other storage structure or format that may be accessed by the web browser 120 and proxy server 124.

In some embodiments, the transparent proxy server 124 is a security/antimalware service that runs on the user device 102 in the background. For every URL request generated by the web browser 120, the web browser 120 will first check the requested URL against the locally stored URL blocklist 122. If the locally stored URL blocklist 122 contains the URL, the web browser 120 will deny access to the URL requested. In addition, for every URL request generated by the web browser 120, the proxy server 124 will intercept the URL request and will forward the URL to the centralized server 104 to check whether the URL is malicious (e.g., via communication 126). If the centralized server 104 determines the URL is not malicious, the transparent proxy server 124 will either allow the web browser 120 to establish the connection with the requested resource associated with the URL (e.g., web server 106). If the centralized server 104 determines the URL is malicious, the transparent proxy server 124 will block the connection. In embodiments, if the requested URL is determined to be malicious, the proxy server 124 or the web browser 120 may generate a notification (e.g., a warning message) to display on the user device 102 to inform a user of a reason why access to the requested URL is being denied. In some embodiments, the denial of access to the URL may be overridden by a user selection through interaction with the web browser 120 or other interface displayed by the proxy server 124 (i.e., by entering an override command into the web browser 120 or the proxy server 124).

In some embodiments, the proxy server 124 will also add any malicious URLs determined by the centralized server 104 to the local URL blocklist 122. In some embodiments, the proxy server 124 may receive a list or a number of malicious URLs (e.g., 10*s*, 100*s*, or 1000*s* of malicious URLS) determined by the centralized server 104, and updates or replaces the local URL blocklist 122 accordingly.

The centralized server 104 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138 and a URL verification module. The URL verification module 140 may include a URL blocklist 142 in the form of a database, file or other storage structure, a machine learning module 144, and a web crawler 146.

In operation, in some embodiments as described above, when a user device 102 generates a URL request, the transparent proxy server 124 running on the user device 102 will send the URL to the centralized server 104 for processing. The request may be sent as a request for URL verification to determine if it is malicious. The URL verification module 140 will process the URL verification request through one or more layers of URL filtering. As a first layer of URL filtering, the URL verification module 140 may first check the received URL against the stored blocklist 142 of malicious URLs for comparison to the requested URL. The centralized server 104 receives the URL request and compares the requested URL with the malicious URLs in the blocklist 142 to determine whether or not the requested URL matches a URL on the blocklist 142. If the requested URL matches a URL on the blocklist 142, then the centralized server 104 generates a response (e.g., a URL filter determination) to the proxy server 124 on the user device 102 including a notification that the URL is malicious. If the URL does not match a URL on the blocklist 142, the centralized server 104 then goes on to perform a second layer of filtering by predicting whether or not the unseen URL is malicious based on machine learning algorithms and trained models it has created/stored based on previous analysis and verification of seen URLs.

The centralized server 104 may employ a machine learning module 144 to generate blocklist rules that can be applied to the requested URL to predict whether or not the requested URL is malicious. If the requested URL is predicted to be malicious based on the blocklist rules, the centralized server 104 generates a response to the proxy server 124 (e.g., a URL filter determination) including a notification that the URL is malicious. The centralized server 104 also updates the blocklist 142 to include the predicted malicious URL, which may be stored in the memory/storage 136. Thus, the system 100 is configured to dynamically update the blocklist 142 and learn from the predictions. The updated blocklist 142 may be distributed to the user device 102 as well as other user devices 102 and/or web crawlers to update their respective blocklists.

In some embodiments, the machine learning algorithms used by machine learning module 144 may include a multi-layer neural network comprising nodes that are trained to have specific weights and biases. In some embodiments, the machine learning algorithm employs artificial intelligence techniques or machine learning techniques to determine malicious URLs which may exhibit predictable patterns. In some embodiments, in accordance with the present principles, suitable machine learning techniques can be applied to learn commonalities in malicious URLs and for determining from the machine learning techniques at what level malicious URLs can be canonicalized. In some embodiments, machine learning techniques that can be applied to learn commonalities in malicious URLs can include, but are not limited to, regression methods, ensemble methods, or neural networks and deep learning such as 'Seq2Seq' Recurrent Neural Network (RNNs)/Long Short Term Memory (LSTM) networks, Convolution Neural Networks (CNNs), Encoders and/or Decoders (including Transformers), graph neural networks applied to the abstract syntax trees corresponding to the malicious URLs, and the like.

In some embodiments, at least one of the blocklist 142, the machine learning module 144, or the web crawler 146 may reside on the proxy server 124 to reduce any latency caused by communication between the centralized server 104 and the proxy server 124 over the communication network 108.

In some embodiments, the blocklist rules are derived from an analysis of the blocklist 142. For example, the machine learning module 144 may train a machine learning model to derive blocklist rules based on known malicious URLs that are in the blocklist 142 as well as URLs that are known to be non-malicious. Thus, the machine learning module 144 can employ the blocklist 142 and a list of non-malicious URLs to train the machine learning model to generate the blocklist rules. The machine learning model may be trained under the assumption that malicious URLs are often generated in predictable patterns. For example, one blocklist rule that may be generated from the machine learning model is that a URL containing related words may indicate the URL is not malicious. In such an example, in applying the blocklist rules, the processor may check if words in the requested URL are related to, or are likely to be next to, each other. As another example, one blocklist rule may be that URLs that contain words in proper context are less likely to be malicious. In such a case, the processor may employ natural language processing (NLP) to analyze a URL contextually.

In embodiments, the centralized server 104 is configured to send a response (e.g., URL filter determination) to the proxy server 124. Based on the response, the proxy server 124 may be permitted or restricted from accessing the requested URL. The centralized server 104 is configured to determine that the URL is malicious if the URL matches a URL on the blocklist 142 and to determine that the URL is not malicious if the URL does not match a URL on the blocklist and is predicted to not be malicious.

Figure 2:
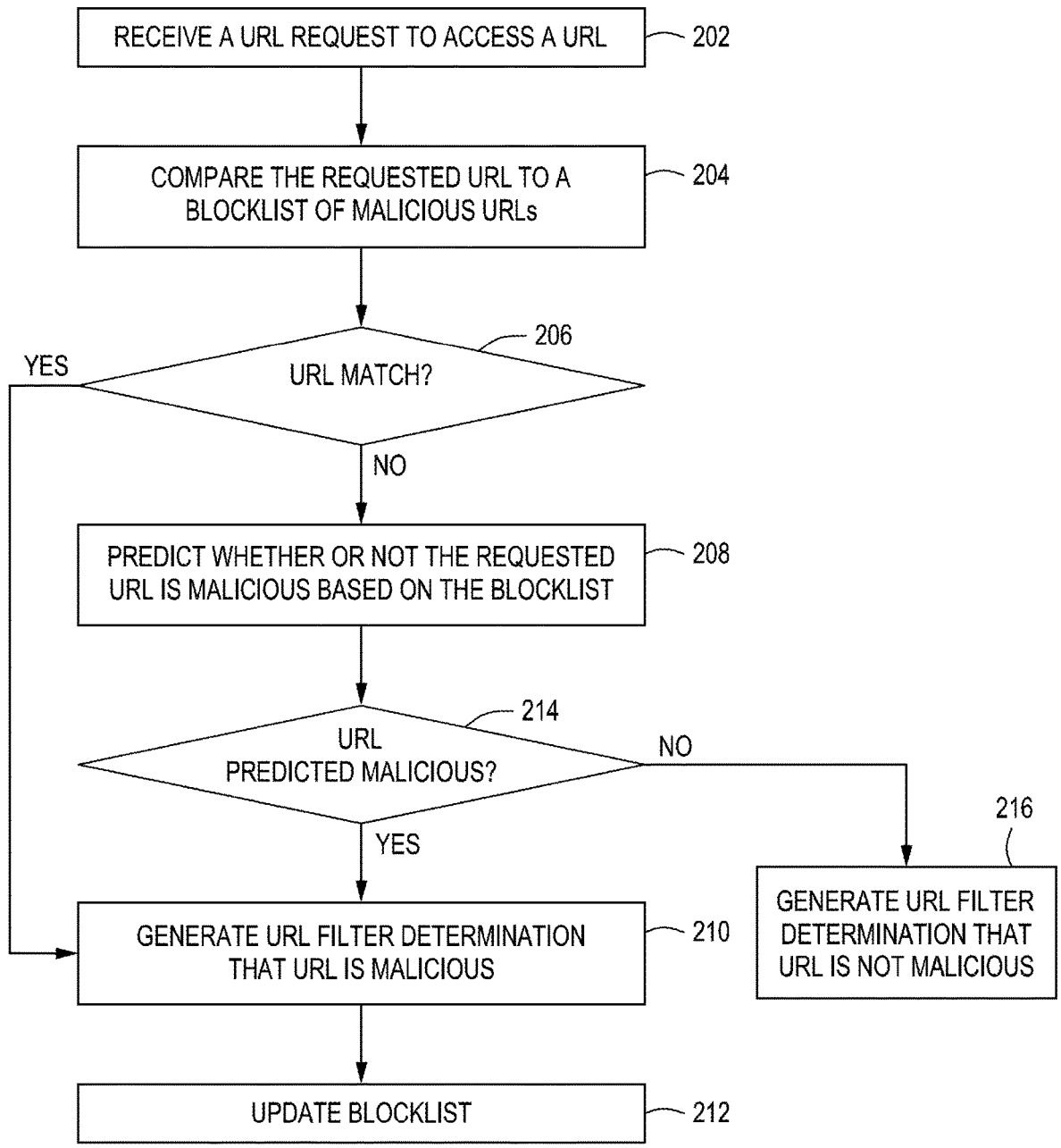
FIG. 2 depicts a flow diagram of a method for URL filtering, in accordance with an embodiment of the present principles.
Figure 3:
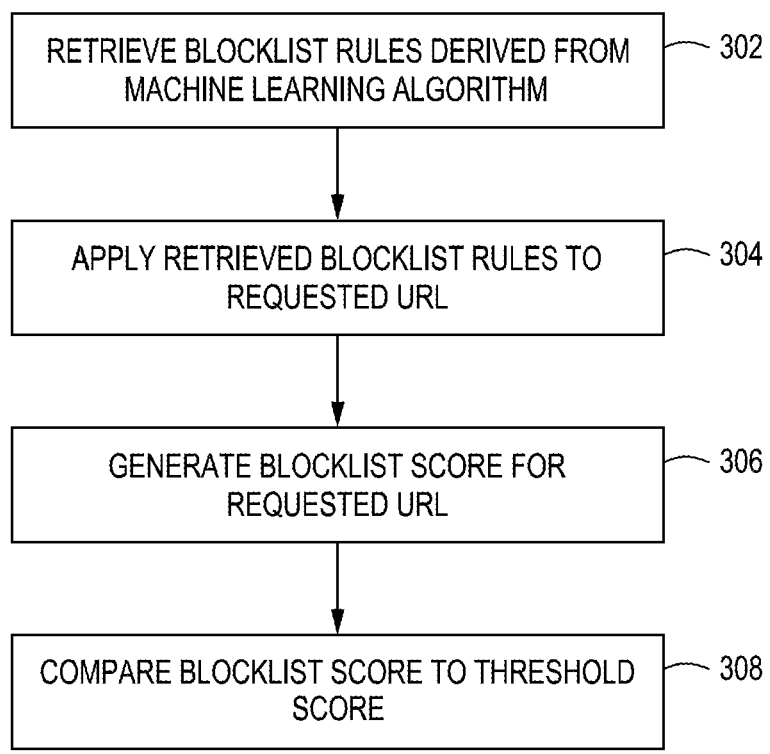
FIG. 3 depicts a flow diagram of a sub-process of the method depicted in FIG. 2, in accordance with an embodiment of the present principles.
Figure 4:
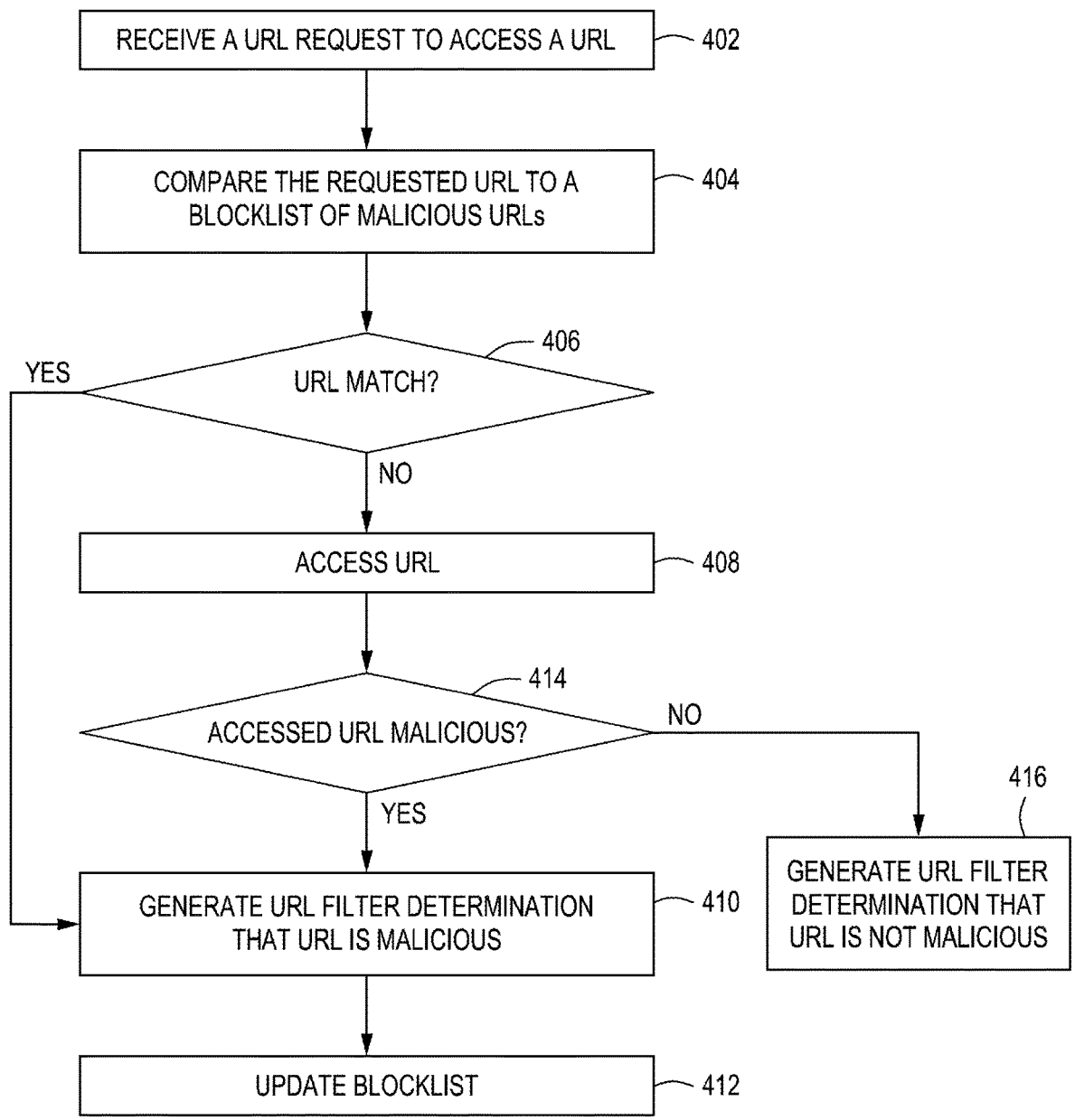
FIG. 4 depicts a flow diagram of a method for URL filtering, in accordance with an embodiment of the present principles.

FIGS. 2-4 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is an example process 200 a flow diagram of a method for efficient URL filtering, in accordance with an embodiment of the present principles. Such a process 200 may begin at step 202 by receiving at the centralized server 104 a URL request from the user device 102 through the communication network 108. The method 200 may also include a step 204 of comparing the requested URL to the blocklist 142 of malicious URLs. The method 200 may also include a determination step 206 to determine whether the requested URL matches a URL on the blocklist 142. If the requested URL matches a URL on the blocklist 142 (Yes at step 206), then a URL filter determination is generated that the requested URL is malicious at step 210 and the blocklist 122 on the user device 102 is updated at step 212.

If the requested URL does not match a URL on the blocklist 142 (No at step 206), the method 200 predicts at step 208 whether or not the requested URL is malicious based on the blocklist 142. The method includes a determination step 214 of determining whether or not the requested URL is malicious based on the prediction. If the requested URL is determined to be malicious based on the prediction (Yes at step 214), the method 200 includes generating a URL filter determination that the requested URL is malicious at step 210 and updating and storing the blocklists 142 and 122 at step 212. If the requested URL is determined to be not malicious based on the prediction (No at step 214), the method 200 includes generating a URL filter determination that the requested URL is not malicious at step 216. The URL filter determinations can be sent to the proxy server 124 via communication 126.

FIG. 3 depicts a flow diagram of an example of a sub-process 300 of step 208 of predicting whether the requested URL is malicious. The sub-process 300 may begin at step 302 by retrieving blocklist rules derived from a machine learning algorithm. The sub-process 300 may also include a step 304 of applying the retrieved blocklist rules to the requested URL. The sub-process may also include a step 306 of generating a score based on the blocklist rules. The sub-process 300 may include a step 308 of comparing the determined score to a settable threshold to determine whether or not the URL is malicious. For example, in some embodiments, if the score is at or above the threshold, the requested URL may be determined to be malicious, while a score below the threshold may be determined to be not malicious. In other embodiments, two thresholds—a lower and an upper—may be used. For example, if the score is below the lower threshold, the URL may be determined as not being malicious, while if the score is above the upper threshold, the URL may be determined as being malicious. Moreover, if the score is between the upper and lower thresholds, the URL is determined as potentially malicious (some similar URLs to the requested URL were malicious (were associated with malicious content), and some similar URLs to requested one were not malicious (were not associated with malicious content)).

FIG. 4 depicts a flow diagram of another method 400 for efficient filtering of URLs. Such a process 400 may begin at step 402 by receiving a URL request from the proxy server 124 through the communication network 106. The method 400 may also include a step 404 of comparing the requested URL to a blocklist 142 of malicious URLs. The method may additionally include a determining step 406 of determining whether or not the requested URL matches a URL on the blocklist 142. If the accessed URL matches a URL on the blocklist 142 (Yes at step 406), the method 400 generates a URL filter determination at step 410 that the requested URL is malicious and updates and stores the blocklist 142 at step 412. If the requested URL does not match a URL on the blocklist 142 (No at step 406), the method 400 accesses the requested URL (e.g., using the web crawler 146) at step 406 to determine whether the accessed URL is malicious. The method also includes a determining step 414 for determining whether the accessed URL is malicious. If the accessed URL is malicious (Yes at step 414), the method generates at step 410 the URL filter determination that the URL is malicious and updates and stores the blocklist at step 412. Otherwise, if the accessed URL is not malicious (No at step 414), then the method 400 generates at step 416 a URL filter determination that the requested URL is not malicious. The URL filter determinations can be sent to the proxy server 124 via communication 126.

However, evading detection by malicious URL filtering systems becomes possible through gradual alterations to existing domain names of, for example, websites containing malicious content. In such instances, by changing existing domain names, the malicious URL will no longer match blocklisted entries, allowing a user device to access malicious sites.

As such, in some embodiments, URL filtering systems can be fortified by implementing a multi-layered filtering system to enhance security measures against evolving cyber threats, such as malicious websites. In some embodiments, above-described filtering systems can be fortified by adding an additional layer including a machine learning model that conducts filtering predictions, in some embodiments primarily focusing on the most prevalent undesirable URLs. In instances in which the requested URL is similar to an entry on the blocklist, the user's device promptly issues a notification alerting users of potentially malicious content based on the similarity and can subsequently restrict access to the URL.

For example, in some embodiments, on top of the existing 2 layers of the above described embodiments of a Multi-Layered Rule Learning and URL Filtering system of the present principles, such as the Multi-Layered Rule Learning and URL Filtering system 100 of FIG. 1, which can include a first layer of URL filtering by comparing the URL to a blocklist of malicious URLs; and a second layer of filtering by applying a machine learning algorithm to analyze the URL to predict whether the URL is malicious, at least one additional layer (e.g., at least a third layer) of filtering can be added and applied by, for example the URL verification module 140, to further increase the security of web browsing. That is, in some embodiments, a third filtering layer can be included to identify phishing webpages by comparing visual features of requested webpages with visual features of predefined legitimate reference webpages.

For example, in some embodiments, a screenshot of at least a portion of respective pages of a target list of legitimate webpages can be captured and stored. Alternatively or in addition, a generated description of the visual features of at least a portion of respective pages of a target list of legitimate webpages can be stored. Subsequently, when a URL/request for a webpage is received, visual features of the webpage associated with the URL/request for a webpage can be compared with visual features of the stored screenshots and/or the description of the visual features of the legitimate/target webpages by, for example the URL verification module 140, to determine if the requested webpage is legitimate or not based on the comparison. For example, if the comparison reveals that the visual features of the webpage associated with the URL/request for a webpage are different than the visual features of at least one legitimate webpage, the webpage associated with the URL/request can be identified as malicious and/or possibly malicious. Alternatively or in addition, if the comparison reveals that the visual features of the webpage associated with the URL/request for a webpage are similar to the visual features of at least one legitimate webpage, the webpage associated with the URL/request can be identified as legitimate and/or non-malicious.

Alternatively or in addition, some embodiments of a system of the present principles can include a machine learning system/algorithm, such as the machine learning module 144 of the URL verification module 140, to train a machine learning model that can be used to identify if visual features of a webpage associated with a requested/received URL matches, for example, visual features of a screenshot of a legitimate/target webpage and/or the description of the visual features of a legitimate/target webpage in accordance with the present principles. As such, a system of the present principles, such as a Multi-Layered Rule Learning and URL Filtering system of the present principles, such as the Multi-Layered Rule Learning and URL Filtering system 100 of FIG. 1, that includes at least one additional layer (e.g., at least a third layer) of filtering in accordance with the present principles can identify webpages associated with unknown URLs (i.e., URLs not listed in a blocklist or in some embodiments a clean-list) as phishing/malicious webpages or as clean webpages (i.e., webpage associated with a target/reference webpage).

As an example, a third layer identification strategy of the present principles can include creating and/or receiving a reference list (target list) of location-based commonly targeted brands like PayPal, Amazon, Facebook, and Google. Visual elements of webpages of the targeted brands, such as website screenshots, logos, and/or a description of visual elements, can then be collected to form a database that, in some embodiments, can be used to train one or more ML models to recognize the respective visual elements/brands. Subsequently, for webpages and/or webpage requests received, respective visual elements of the requested webpages can be compared to visual elements of the targeted brand webpages to determine if a requested webpage(s) belong to the targeted brands based on the comparison in accordance with the present principles.

In some embodiments of the present principles, a threshold can exist/be set by a user and applied by, for example the URL verification module 140, such that if an amount of similarities between the visual elements of the requested webpage(s) and the visual elements of the targeted brands (i.e., webpages of the targeted brands) exceed the threshold, the requested webpages can be identified as webpages associated with the targeted brands, and if an amount of similarities between the visual elements of the requested webpage(s) and the visual elements of the targeted brands (i.e., webpages of the targeted brands) are below the threshold, the requested webpages can be identified as possible malicious/phishing webpages. Such information can be communicated to a user and/or can be used by a computing system/device of the present principles to control access to the requested webpages in accordance with the present principles.

Alternatively or in addition, in some embodiments, instead of identifying similarities between the visual elements of the requested webpage(s) and the visual elements of the targeted brands, a system of the present principles can identify differences between the visual elements of the requested webpage(s) and the visual elements of the targeted brands. In such embodiments, if an amount of differences between the visual elements of the requested webpage(s) and the visual elements of the targeted brands (i.e., webpages of the targeted brands) are below the threshold, the requested webpages can be identified as webpages associated with the targeted brands, and if an amount of differences between the visual elements of the requested webpage(s) and the visual elements of the targeted brands (i.e., webpages of the targeted brands) exceed the threshold, the requested webpages can be identified as possible malicious/phishing webpages.

In accordance with the present principles, in some embodiments, if it is determined that a resource associated with the URL is malicious, a URL filter determination is generated and transmitted indicating that the resource associated with the URL is malicious and the blocklist is updated to include the URL. Such determination can be communicated to a user device.

In embodiments of the present principles, the similarities and differences of the webpages/visual features described herein can include, but are not limited to, similarities and differences in content, content type, methods and/or applications used for creating content, and the like.

In some embodiments, a system of the present principles can include a list (e.g., a whitelist) identifying URLs/webpages of, for example, targeted brand that are acceptable for being received (i.e., not malicious). In such embodiments, incoming/requested URLs/webpages can be compared against a whitelist to remove such acceptable URLs/webpages from the filtering process such that only unknown URLs/webpages are analyzed in accordance with the present principles.

Figure 6:
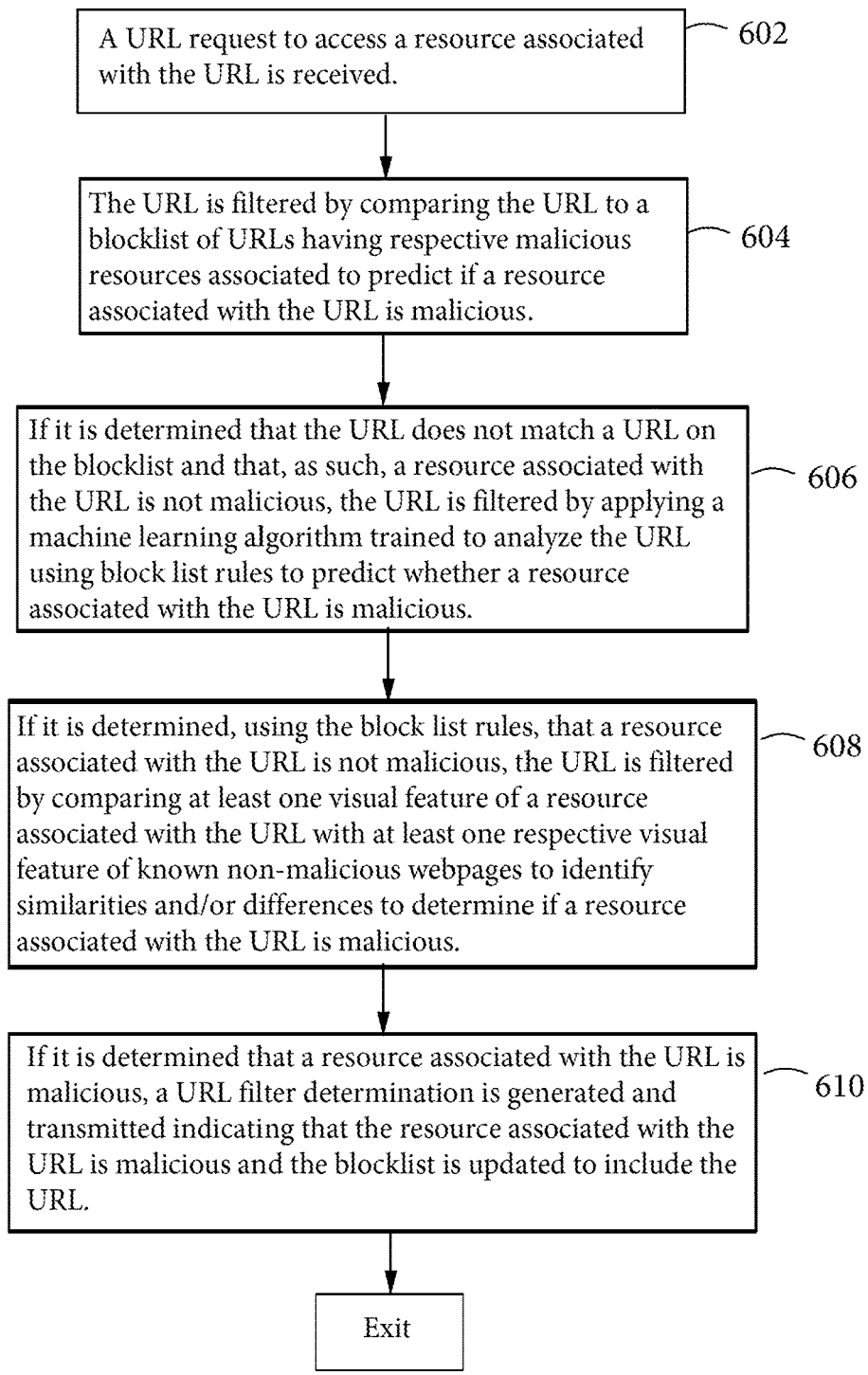
FIG. 6 depicts a flow diagram of a method for URL filtering in accordance with an embodiment of the present principles.

FIG. 6 depicts a flow diagram of a method 600 for URL filtering in accordance with an embodiment of the present principles. The method 600 can begin at 602 during which a URL request to access a resource associated with the URL is received. The method 600 can proceed to 604.

At 604, the URL is filtered by comparing the URL to a blocklist of URLs having respective malicious resources associated to predict if a resource associated with the URL is malicious. The method 600 can proceed to 606.

At 606, if it is determined that the URL does not match a URL on the blocklist and that, as such, a resource associated with the URL is not malicious, the URL is filtered by applying a machine learning algorithm trained to analyze the URL using block list rules to predict whether a resource associated with the URL is malicious. The method 600 can proceed to 608.

At 608, if it is determined, using the block list rules, that a resource associated with the URL is not malicious, the URL is filtered by comparing at least one visual feature of a resource associated with the URL with at least one respective visual feature of known non-malicious webpages to identify similarities and/or differences to determine if a resource associated with the URL is malicious. The method 600 can proceed to 610.

At 610, if it is determined that a resource associated with the URL is malicious, a URL filter determination is generated and transmitted indicating that the resource associated with the URL is malicious and the blocklist is updated to include the URL. The method 600 can then be exited.

Figure 5:
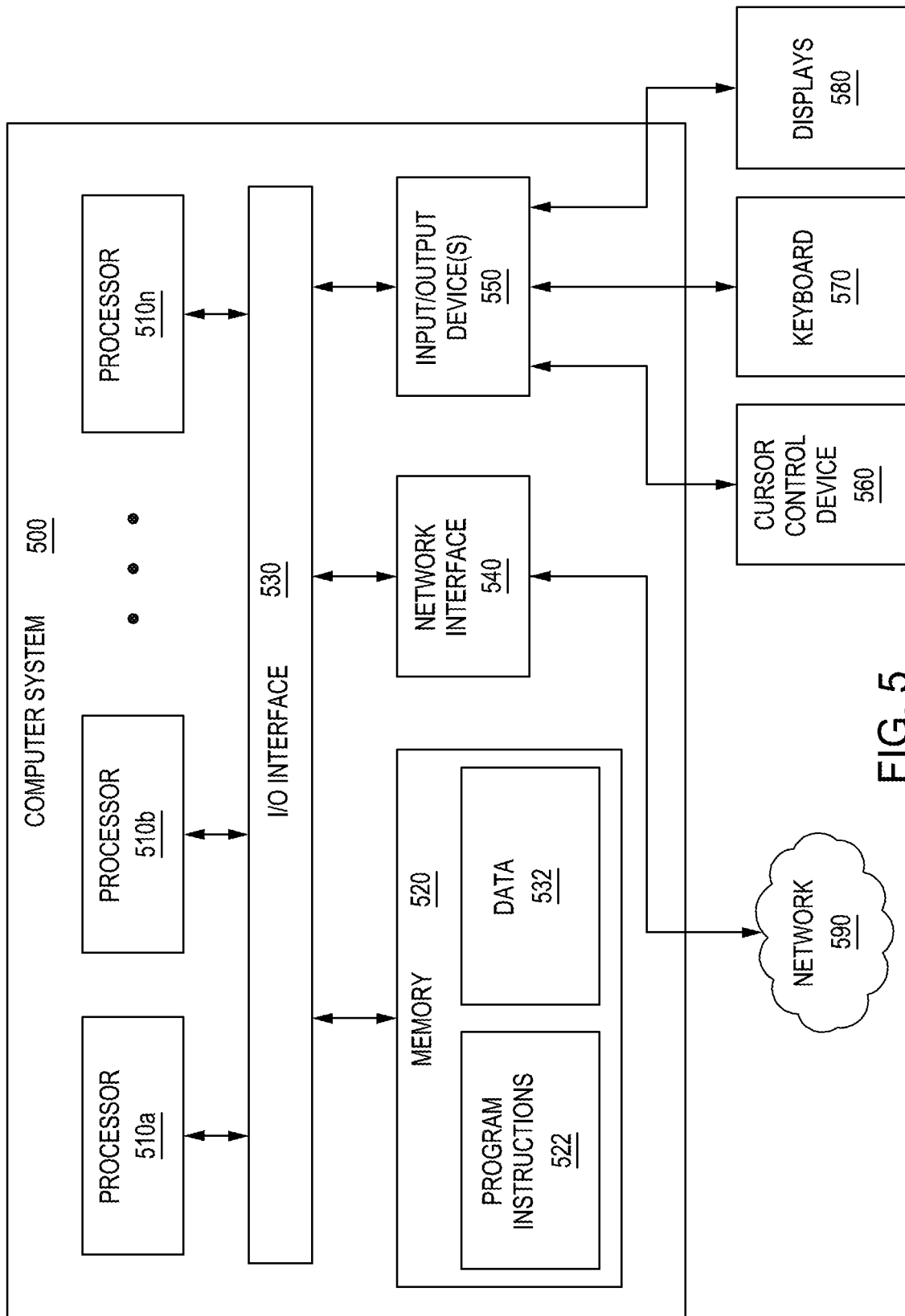
FIG. 5 depicts a high-level block diagram of a computing device suitable for use with embodiments for efficient security scanning of recently downloaded files from the Internet into a computer system in accordance with the present principles.

FIG. 5 depicts a computer system 500 that can be utilized in various embodiments of the disclosure to implement the computer and/or the display, according to one or more embodiments.

Various embodiments of method and system for filtering URLs, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 200, 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner.

Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A URL filtering system comprising:
a processor programmed to:
receive a URL request to access a resource associated with the URL;
perform a first layer of URL filtering by comparing the URL to a blocklist of malicious URLs;
determine that the URL does not match a URL on the blocklist;
perform a second layer of filtering by applying a machine learning algorithm to analyze the URL to predict whether the URL is malicious;
determine that the URL is predicted to be malicious; and
generate and transmit a URL filter determination that the URL is malicious and update the blocklist to include the URL.
B. The system of clause A, wherein the machine learning algorithm includes blocklist rules to predict whether or not the URL is malicious.
C. The system of clauses A or B, wherein the blocklist rules are derived from an analysis of the blocklist.
D. The system of clauses A-C, wherein the machine learning algorithm recognizes patterns in URLs.
E. The system according to clauses A-D, wherein the patterns include related words in a URL or a context of words in a URL.
F. The system according to clauses A-E, wherein the processor is further configured to send the URL filter determination to a user device.
G. The system according to clauses A-F, wherein the processor is further configured to distribute the updated blocklist to at least one of an end user device or a web crawler.
H. A URL filtering method comprising:
receiving a URL request to access a resource associated with the URL;
performing a first layer of URL filtering by comparing the URL to a blocklist of malicious URLs;
performing a second layer of filtering by applying a machine learning algorithm to analyze the URL to predict whether the URL is malicious; and
determining that the URL is predicted to be malicious; and
generating and transmitting a URL filter determination that the URL is malicious and updating the blocklist to include the URL.
I. The method according to clause H, wherein the machine learning algorithm includes blocklist rules to predict whether or not the URL is malicious.
J. The method according to clauses H or I, wherein the blocklist rules are derived from an analysis of the blocklist.
K. The method according to clauses H-J, wherein the machine learning algorithm recognizes patterns in URLs.
L. The method according to clauses H-K, wherein the patterns include related words in a URL or a context of words in a URL.
M. The method according to clauses H-L, further comprising sending the URL filter determination to a user device.
N. The method according to clauses H-M, further comprising distributing the updated blocklist to at least one of an end user device or a web crawler.
O. A non-transitory computer readable medium, which when executed by a processor and a memory, performs a URL filtering method comprising:
receiving a URL request to access a resource associated with the URL;
performing a first layer of URL filtering by comparing the URL to a blocklist of malicious URLs;
performing a second layer of filtering by applying a machine learning algorithm to analyze the URL to predict whether the URL is malicious; and
determining that the URL is predicted to be malicious; and
generating and transmitting a URL filter determination that the URL is malicious and updating the blocklist to include the URL.
P. The computer readable medium according to clause O, wherein the machine learning algorithm includes blocklist rules to predict whether or not the URL is malicious.
Q. The computer readable medium according to clauses O or P, wherein the machine learning algorithm recognizes patterns in URLs.
R. The computer readable medium according to clauses O-Q, wherein the patterns include related words in a URL or a context of words in a URL.
S. The computer readable medium according to clauses O-R, wherein the URL filtering method further comprises sending the URL filter determination to a user device.
T. The computer readable medium according to clauses O-S, wherein the URL filtering method further comprises distributing the updated blocklist to at least one of an end user device or a web crawler.

What is claimed is:
1. A URL filtering system comprising: a hardware processor; and a memory accessible by the processor, the memory having stored therein at least one of programs or instructions executable by the at least one processor to cause the filtering system to perform operations comprising: receiving a URL request to access a resource associated with the URL; filtering the URL by comparing the URL to a blocklist of URLs having respective malicious resources associated to predict if a resource associated with the URL is malicious;
in response to determination that the URL does not match a URL on the blocklist and that, as such, a resource associated with the URL is not malicious, filtering the URL by applying a machine learning algorithm trained to analyze the URL using block list rules to predict whether a resource associated with the URL is malicious;
in response to determination, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious; and in response to determination that a resource associated with the URL is malicious, generating and transmitting a URL filter determination that the resource associated with the URL is malicious and updating the blocklist to include the URL, wherein in response to determination that an amount of the similarities are below a user-defined threshold or an amount of the differences are above the user-defined threshold, the resource associated with the URL is determined to be malicious.

2. The system according to claim 1, wherein the blocklist rules are determined from patterns recognized in at least a portion of text of at least one URL in the blocklist.

3. The system according to claim 2, wherein the patterns include related words in a URL or a context of words in a URL.

4. The system according to claim 1, wherein the at least one visual feature of a resource associated with the URL is compared to at least one of a visual feature of at least one screenshot of the known non-malicious webpages or a description of a visual feature of the known non-malicious webpages.

5. The system according to claim 1, further comprising a machine learning model trained to identify similarities and/or differences between the at least one visual feature of a resource associated with the URL and the at least one respective visual feature of the known non-malicious webpages to determine if a resource associated with the URL is malicious.

6. A URL filtering method comprising:
receiving a URL request to access a resource associated with the URL; filtering the URL by comparing the URL to a blocklist of URLs having respective malicious resources associated to predict if a resource associated with the URL is malicious;

in response to determination that the URL does not match a URL on the blocklist and that, as such, a resource associated with the URL is not malicious, filtering the URL by applying a machine learning algorithm trained to analyze the URL using block list rules to predict whether a resource associated with the URL is malicious;

in response to determination, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious; and in response to determination that a resource associated with the URL is malicious, generating and transmitting a URL filter determination that the resource associated with the URL is malicious and updating the blocklist to include the URL, wherein in response to determination that an amount of the similarities are below a user-defined threshold or an amount of the differences are above the user-defined threshold, the resource associated with the URL is determined to be malicious.

7. The method according to claim 6, wherein the blocklist rules are determined from patterns recognized in at least a portion of text of at least one URL in the blocklist.

8. The method according to claim 7, wherein the patterns include related words in a URL or a context of words in a URL.

9. The method according to claim 6, wherein the at least one visual feature of a resource associated with the URL is compared to at least one of a visual feature of at least one screenshot of the known non-malicious webpages or a description of a visual feature of the known non-malicious webpages.

10. The method according to claim 6, further comprising applying a machine learning model trained to identify similarities and/or differences between the at least one visual feature of a resource associated with the URL and the at least one respective visual feature of the known non-malicious webpages to determine if a resource associated with the URL is malicious.

11. A non-transitory computer readable medium, which when executed by a processor and a memory, performs a URL filtering method comprising:
receiving a URL request to access a resource associated with the URL; filtering the URL by comparing the URL to a blocklist of URLs having respective malicious resources associated to predict if a resource associated with the URL is malicious;

in response to determination that the URL does not match a URL on the blocklist and that, as such, a resource associated with the URL is not malicious, filtering the URL by applying a machine learning algorithm trained to analyze the URL using block list rules to predict whether a resource associated with the URL is malicious;

in response to determination, using the block list rules, that a resource associated with the URL is not malicious, filtering the URL by comparing at least one visual feature of a resource associated with the URL with at least one respective visual feature of known non-malicious webpages to identify similarities and/or differences to determine if a resource associated with the URL is malicious; and in response to determination that a resource associated with the URL is malicious, generating and transmitting a URL filter determination that the resource associated with the URL is malicious and updating the blocklist to include the URL, wherein in response to determination that an amount of the similarities are below a user-defined threshold or an amount of the differences are above the user-defined threshold, the resource associated with the URL is determined to be malicious.

12. The computer readable medium according to claim 11, wherein the blocklist rules are determined from patterns recognized in at least a portion of text of at least one URL in the blocklist.

13. The computer readable medium according to claim 12, wherein the patterns include related words in a URL or a context of words in a URL.

14. The computer readable medium according to claim 11, wherein the at least one visual feature of a resource associated with the URL is compared to at least one of a visual feature of at least one screenshot of the known non-malicious webpages or a description of a visual feature of the known non-malicious webpages.

15. The computer readable medium according to claim 11, wherein the method further comprises applying a machine learning model trained to identify similarities and/or differences between the at least one visual feature of a resource associated with the URL and the at least one respective visual feature of the known non-malicious webpages to determine if a resource associated with the URL is malicious.

* * * * *